United States Patent
Alexander et al.

(10) Patent No.: US 11,169,777 B2
(45) Date of Patent: Nov. 9, 2021

(54) MULTIPLE MODES FOR HANDLING OVERFLOW CONDITIONS RESULTING FROM ARITHMETIC OPERATIONS

(71) Applicant: Graphcore Limited, Bristol (GB)

(72) Inventors: Alan Graham Alexander, Wotton-Under-Edge (GB); Edward Andrews, Bristol (GB); Stephen Felix, Bristol (GB); Mrudula Chidambar Gore, Bath (GB)

(73) Assignee: Graphcore Limited, Bristol (GB)

( * ) Notice: Subject to any disclaimer, the term of this patent is extended or adjusted under 35 U.S.C. 154(b) by 228 days.

(21) Appl. No.: 16/395,328

(22) Filed: Apr. 26, 2019

(65) Prior Publication Data

US 2020/0201600 A1 Jun. 25, 2020

(30) Foreign Application Priority Data

Dec. 21, 2018 (GB) .................................. 1821059.1

(51) Int. Cl.
*G06F 7/499* (2006.01)
*G06F 9/30* (2018.01)

(52) U.S. Cl.
CPC ...... *G06F 7/49915* (2013.01); *G06F 7/49994* (2013.01); *G06F 9/3001* (2013.01); *G06F 9/30123* (2013.01)

(58) Field of Classification Search
CPC ............. G06F 7/49915; G06F 7/49994; G06F 9/3001; G06F 9/30123
See application file for complete search history.

(56) References Cited

U.S. PATENT DOCUMENTS

| | | | |
|---|---|---|---|
| 5,508,951 A | 4/1996 | Matsushita | |
| 5,553,015 A * | 9/1996 | Elliott | G06F 7/483 708/498 |
| 6,219,685 B1 * | 4/2001 | Story | G06F 9/30094 708/498 |
| 2004/0167949 A1 | 8/2004 | Park | |

FOREIGN PATENT DOCUMENTS

EP 1058185 A1 12/2000

OTHER PUBLICATIONS

Search Report for United Kingdom Patent Application No. GB1821059.1 dated Sep. 30, 2019.

* cited by examiner

*Primary Examiner* — Michael D. Yaary
(74) *Attorney, Agent, or Firm* — Haynes and Boone, LLP

(57) ABSTRACT

A method and apparatus for handling overflow conditions resulting from arithmetic operations involving floating point numbers. An indication is stored as part of a thread's context indicating one of two possible modes for handling overflow conditions. In a first mode, a result of an arithmetic operation is set to the limit representable in the floating point format. In a second mode, a result of an arithmetic operation is set to a NaN.

23 Claims, 6 Drawing Sheets

MULTIPLE MODES FOR HANDLING OVERFLOW CONDITIONS RESULTING FROM ARITHMETIC OPERATIONS

CROSS-REFERENCE TO RELATED APPLICATIONS

This application claims the priority benefit under 35 U.S.C. § 119 of United Kingdom Patent Application No. 1821059.1, filed Dec. 21, 2018, the entire contents of which are incorporated herein by reference.

TECHNICAL FIELD

The present disclosure relates to a method and apparatus for detecting errors during calculations using floating point numbers, for example in order to debug a processor which is executing such calculations.

BACKGROUND

In computing, bit sequences of predefined sizes are used to represent numbers. The particular representation of the bit sequence determines how a bit sequence is interpreted.

One form of representation is the floating-point representation, which is often used to approximately represent real numbers. Floating-point representations are laid out in IEEE Standard 754. The floating-point representation comprises 3 separate components, i.e. a sign component, a mantissa component, and an exponent component. In the so-called single-precision (i.e. 32-bit) floating point representation (according to IEEE Standard 754), the sign component consists of a single bit, the exponent consists of 8 bits, and the mantissa consists of 23 bits. In the so-called half-precision (i.e. 16-bit) floating-point representation (according to IEEE standard 754), the sign component consists of a single bit, the mantissa consists of 10 bits, and the exponent consists of 5 bits. In most cases, a number is given from these 3 components by the following formula:

$$(-1)^{signbit} \times 1.mantissa \times 2^{exponentbits-offset}$$

The displayed "offset" to the exponent is dependent upon range of values required. IEEE 754 has chosen values as follows. In the single-precision representation, the offset is equal to 127. In the half-precision format, the offset is equal to 15.

Here "1" is an implicit bit, which is derived from the exponent. In the case that the exponent bit sequence consists of anything other than all zeros or all ones, the implicit bit is equal to one and the number is known as a normal (abbreviated to "Norm" herein). In this case, the floating point number is given by:

$$(-1)^{signbit} \times 1.mantissa \times 2^{exponentbits-offset}$$

In the case that the exponent bit sequence consists of all zeros, the implicit bit is equal to zero and the number is known as denormalised or subnormal, (abbreviated to "denorm" herein) "denorm". In this case, the floating point number is given by:

$$(-1)^{signbit} \times 0.mantissa \times 2^{exponentbits-offset}$$

The denorms are useful, since they allow smaller numbers to be represented than would otherwise be representable by the limited number of exponent bits.

The other circumstance—in which the exponent bit sequence consists of all ones—may be used to represent special cases, e.g. ±infinity or NaN. NaN (Not a Number) is a numeric data type value representing an undefined or unrepresentable value. The presence of a NaN in the results of a calculation is often taken to signal an exception. In any event, subsequent steps in a calculation cannot be carried out.

Table 1 summaries how the floating point numbers are interpreted for different ranges of the exponent and the mantissa according to the IEEE 754 standard.

TABLE 1

| Exponent | Mantissa Zero | Mantissa non-zero |
|---|---|---|
| $00_H$ | zero, −0 | denormal numbers |
| $01_H, \ldots, FE_H$ | | normalized value |
| $FF_H$ | ±infinity | NaN (quiet, signalling) |

As shown in table 1, if the exponent consists of all zeros, and the mantissa consists of all zeros, the floating point number is taken to be equal to zero (either +0, −0). If the exponent consists of all zeros and the mantissa is non-zero, the floating point number is a denorm. If the exponent consists of all ones and the mantissa consists of all zeros, the floating point number is taken to represent ±infinity. If the exponent consists of all ones and the mantissa is non-zero, the floating point number is taken to be equal to NaN. In the case that the exponent is anything other than all zeros and all ones, the floating point number is a norm. The IEEE standard lays out a number of different NaN code; represented by different mantissa values.

As shown in the table, there are broadly two types of NaN result that may result. A quiet NaN is a NaN that does not raise any additional exceptions (although an exception may be raised upon its creation) as it propagates through operations. In contrast, a signalling NaN is a special form of NaN, which when consumed by an operation will raise an invalid operation exception and then, if appropriate, be transformed into a quiet NaN that may propagate through further operations without raising any further exceptions.

The floating point representation may be used to represent numbers in implementations of neural network processing. An implementation of neural networks involves the storage and manipulation of such floating point numbers. Neural networks are used in the field of machine learning and artificial intelligence. Neural networks comprise arrangements of sets of nodes which are interconnected by links and which interact with each other. The principles of neural networks in computing are based on information about how electrical stimuli convey information in the human brain. For this reason, the nodes are often referred to as artificial neurons or simply neurons. They may also be referred to as vertices. The links are sometimes referred to as edges. The network can take input data and certain nodes perform operations on the data. The result of these operations is passed to other nodes. The output of each node is referred to as its activation or node value. Each link is associated with a weight. A weight defines the connectivity between nodes of the neural network. Many different techniques are known by which neural networks are capable of learning, which takes place by altering values of the weights.

FIG. 1 shows an extremely simplified version of one arrangement of nodes in a neural network. This type of arrangement is often used in learning or training and comprises an input layer of nodes, a hidden layer of nodes and an output layer of nodes. In reality, there will be many nodes in each layer, and nowadays there may be more than one layer per section. Each node of the input layer Ni is capable of producing at its output an activation or node value which is generated by carrying out a function on data provided to that node. A vector of node values from the input layer is scaled by a vector of respective weights at the input of each node in the hidden layer, each weight defining the connectivity of that particular node with its connected node in the hidden layer. In practice, networks may have millions of nodes and be connected multi-dimensionally, so the vector is more often a tensor. The weights applied at the inputs of the node Nh are labelled w0 . . . w2. Each node in the input layer is connected at least initially to at least one node in the hidden layer. At least one node in the hidden layer can perform an activation function on the data which is provided to them and can generate similarly an output vector which is supplied to one or more nodes $N_O$ in the output layer $N_O$. Each node weights its incoming data, for example by carrying out the dot product of the input activations of the node and its unique weights for the respective incoming links. It then performs an activation function on the weighted data. The activation function can be for example a sigmoid. See FIG. 1A. The network learns by operating on data input at the input layer, assigning weights to the activations from each node and acting on the data input to each node in the hidden layer (by weighing it and performing the activation function). Thus, the nodes in the hidden layer operate on the weighted data and supply outputs to the nodes in the output layer. Nodes of the output layer may also assign weights. Each weight is characterised by a respective error value. Moreover, each node may be associated with an error condition. The error condition at each node gives a measure of whether the error in the weight of the node falls below a certain level or degree of acceptability. There are different learning approaches, but in each case there is a forward propagation through the network from left to right in FIG. 1, a calculation of overall error, and a backward propagation from right to left in FIG. 1 through the network of the error. In the next cycle, each node takes into account the back propagated error and produces a revised set of weights. In this way, the network can be trained to perform its desired operation.

Certain calculations may be carried out, such as floating-point vector summation, which cause the value of a floating point result to overflow, i.e. the result of the calculation exceeds the maximum or minimum representable value in the floating point format. One proposed way for handling overflow conditions is to set the floating point number result to be equal to ±infinity. Subsequent calculations (such as summations) using the results equal to ±infinity can result in NaNs. Therefore, the result of the overflow condition occurring may be a plurality of floating point numbers in the outputs representing both ±infinity and NaNs. This may be undesirable, since no useful result from the calculations can be obtained. It is notoriously difficult to detect occurrences of overflow conditions when implementing such a machine learning application in a processor. Overflow conditions which generate an infinity result may not cause an application to halt, although they may later have the effect of causing NaN to be generated. The original cause of the NaN (the infinity result) may be impossible to locate.

SUMMARY

Many operations can be carried out in such machine learning algorithms using half precision (f16) floating point numbers. Although there is a loss in precision, there is a benefit in the reduction of memory usage and speed of processing. In the half-precision floating point format according to IEEE 754, the maximum/minimum representable number is ±65504. If a calculation results in a value greater than the maximum or less than a minimum is carried out, this would have in the past caused an overflow result [NaN or infinity]. The present inventors have recognised that instead, the limit value (the maximum or the minimum saturation value) can be used in such an overflow condition. This has the advantage that calculations are not interrupted during execution of the machine learning application. This is particularly advantageous where millions of calculations need to be performed interactively, with inputs derived from results of earlier calculations. Furthermore, the inventors have noticed that for most machine learning applications that they have executed, there is no drop in the performance which is perhaps surprising. The effect of using a max/min limit value (which is not the correct result of the calculation), in a later calculation, would be expected to have an impact on accuracy or usefulness of the algorithms. However, it does give rise to a problem when attempting to detect overflow conditions. They are masked by the use of limit values, which are perceived by the subsequent calculations as actual values.

According to a first aspect of the invention, there is provided a processing system comprising: a processing unit configured to execute one or more arithmetic operations using values represented by digital representations which extend between predefined limit values; at least one register configured to store a mode indication indicating operation in a first mode or a second mode; at least one memory for storing outputs of the one or more arithmetic operations, wherein the processing unit is configured to: check the indication(s) to determine whether the arithmetic operation is to be executed in the first mode or in the second mode; wherein in the first mode, in response to the respective arithmetic operation resulting in a value exceeding a limit value of the digital representation, a result number having the limit value which was executed is stored in the memory; and in a second mode, in response to the respective arithmetic operation resulting in a value exceeding a limit value of the digital representation, an output code is stored with the memory, the output code indicating a result that cannot be processed as a value.

Each arithmetic operation may be defined by a respective thread of a plurality of threads. The register may store a plurality of indications each associated with one of the plurality of threads. The register may comprise a plurality of status registers each associated with one of the plurality of threads.

One or more of the arithmetic operations may use floating point numbers belonging to a floating point format. The floating point format may have predefined limit values which comprise a maximum value and a minimum value, both of which are representable in the floating point format. If the respective arithmetic operation results in a value which exceed the range of the floating point format, a flag may be set indicating an overflow condition has occurred.

The indications may set the first mode for a first floating point precision, which may be half-precision, and not for a second floating point precision, which may be single precision. In response to determining that a debugging mode is active for the processing system, mode indicators may be written to the register to indicate the second mode. In the second mode, if the respective arithmetic operations results in a value which exceeds the floating point format range, an exception may be raised.

A floating point number representing positive or negative infinity may be received. A calculation may be performed using this floating point number and the result, a floating point number representing NaN, stored. An exception may be raised in response to this calculation.

A floating point number at a first precision level, representing positive or negative infinity, may be converted to a floating point number at a second precision level, representing NaN. An exception may be raised in response to this conversion.

According to a second aspect of the invention, there is a method for executing one or more arithmetic operations using values represented by digital representations which extend between predefined limit values, the method comprising: storing a mode indication indicating operation in a first mode or a second mode; storing outputs of the one or more arithmetic operations; checking the indication(s) to determine whether the arithmetic operation is to be executed in the first mode or in the second mode; wherein in the first mode, in response to the respective arithmetic operation resulting in a value exceeding a limit value of the digital representation, a result number having the limit value which was executed is stored in the memory; and in a second mode, in response to the respective arithmetic operation resulting in a value exceeding a limit value of the digital representation, an output code is stored with the memory, the output code indicating a result that cannot be processed as a value.

According to a third aspect of the invention, there is provided a computer program product comprising a computer program which comprises a computer program instruction recorded on non-transitory media which when executed causes a hardware module to carry out a method as set out herein.

BRIEF DESCRIPTION OF THE DRAWINGS

To assist understanding of the present disclosure and to show how embodiments may be put into effect, reference is made by way of example to the accompanying drawings in which.

DETAILED DESCRIPTION OF EMBODIMENTS

The present disclosure considers a processor which operates in its normal mode using limit values in half precision calculations in overflow conditions. A second mode of operation is also available in which NaNs are produced in an overflow condition, for example in debugging.

The following describes components of a processor having an architecture which has been developed to address issues arising in the computations involved in machine intelligence applications. The processor described herein may be used as a work accelerator; that is, it receives a workload from an application running on a host computer, the workload generally being in the form of very large data sets to be processed (such as the large experience data sets used by a machine intelligence algorithm to learn a knowledge model, or the data from which to perform a prediction or inference using a previously-learned knowledge model). An aim of the architecture presented herein is to process these very large amounts of data highly efficiently. The processor architecture has been developed for processing workloads involved in machine intelligence. Nonetheless, it will be apparent that the disclosed architecture may also be suitable for other workloads sharing similar characteristics.

One facet of an accelerator is that, in normal operation, it is generally not desirable to encounter states where it cannot continue to operate. However, it is important that the accelerator can be debugged, which requires identification of overflow conditions. Some machine learning frameworks (Tensforflow for example) and their associated debuggers may not use such events (interrupts) as part of the normal debug cycle but instead use filters (detectors) for special intermediate result values.

Following debugging, it would not be expected that NaNs or infinities would be generated at runtime in the half precision calculations. The present disclosure addresses these issues by providing two modes of operation for handling overflow conditions. A debug flow can run applications in a normal runtime environment and check for error values such as infinities and NaNs. Once identified, their location and context can be analysed to improve the application.

Figure 1:
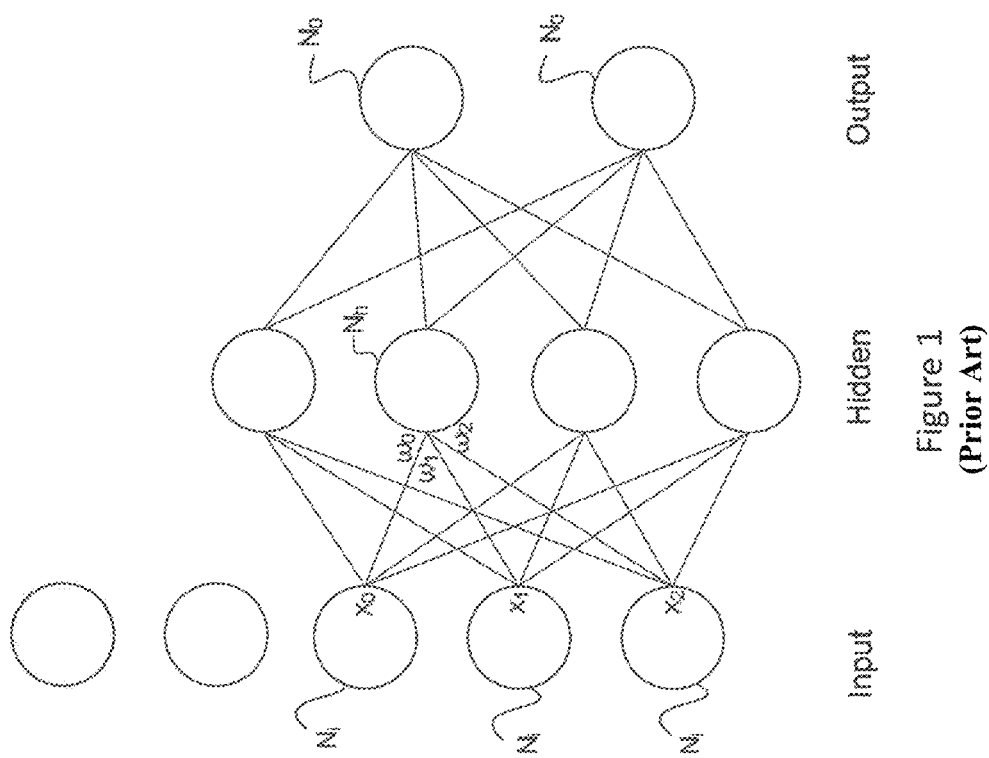
FIG. 1 is a highly simplified schematic view of a neural net.
Figure 1A:
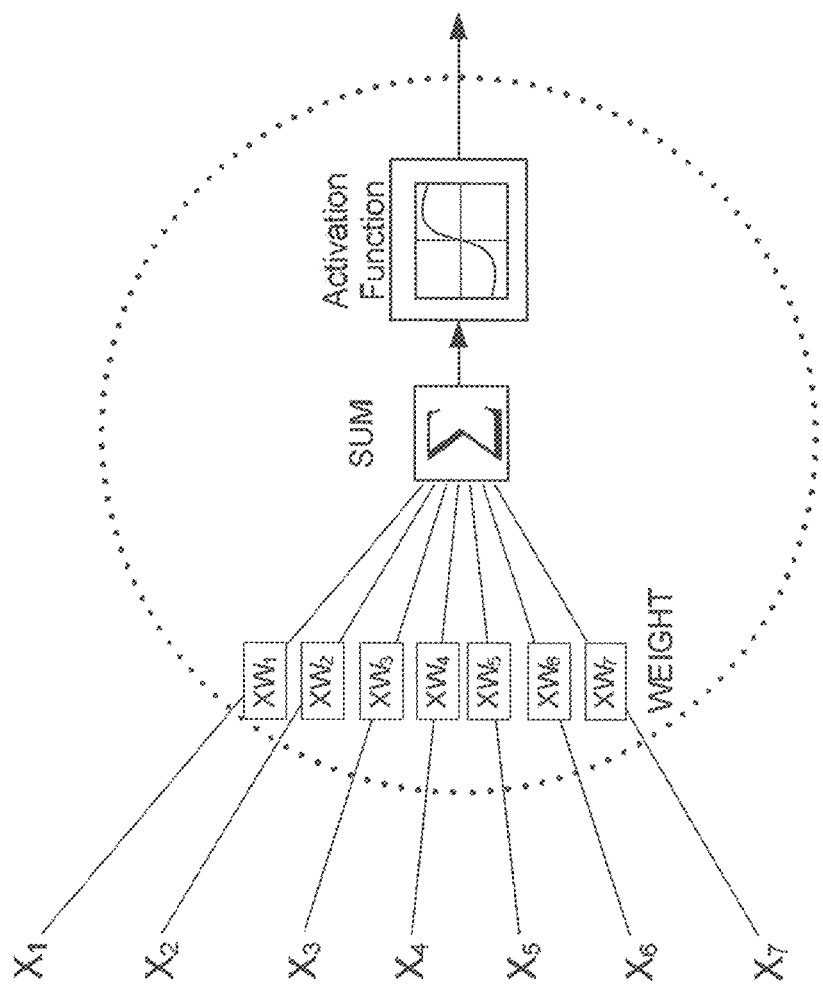
FIG. 1A is a highly simplified schematic view of an artificial neuron.
Figure 2:
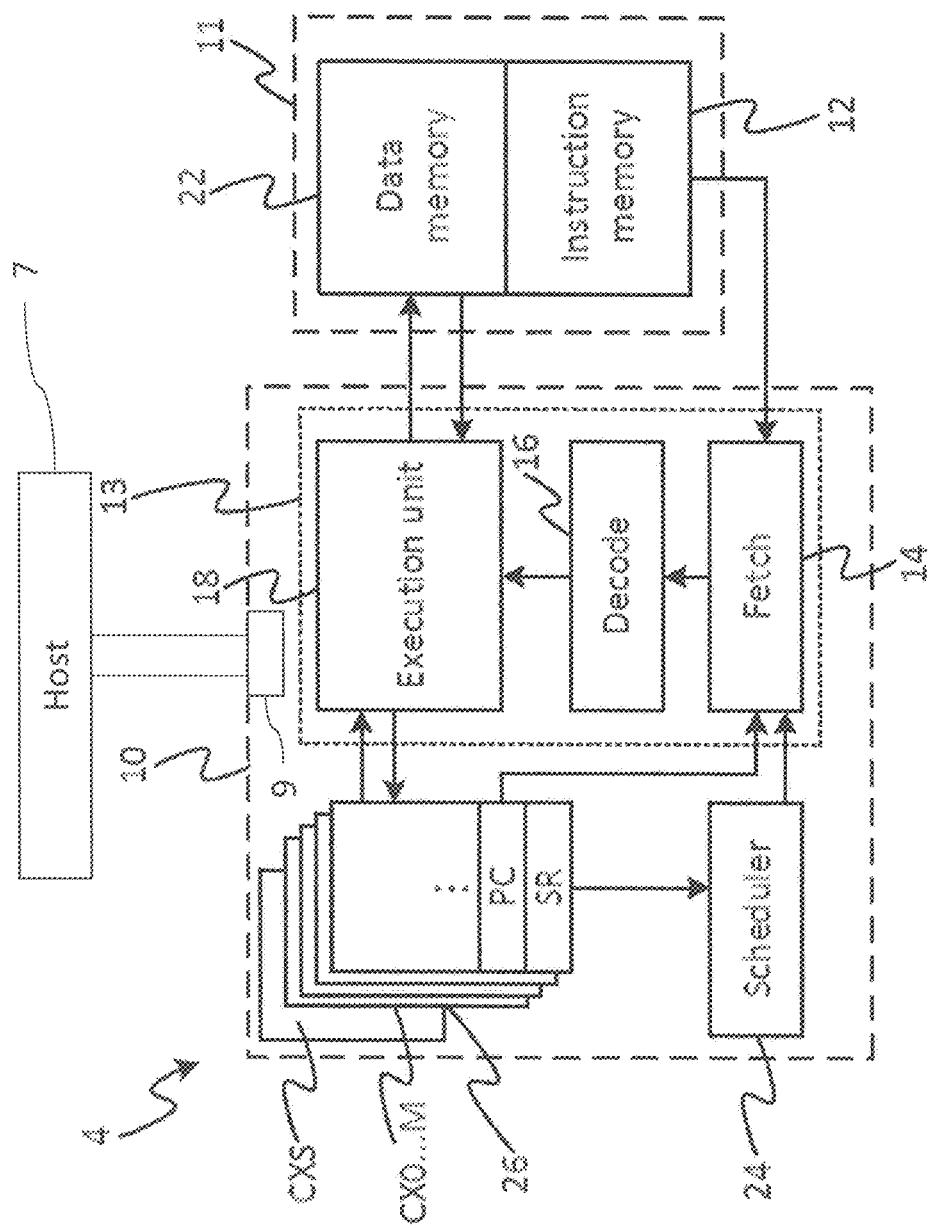
FIG. 2 is a schematic block diagram of a multi-threaded processor.

FIG. 2 illustrates an example of a processor module 4 in accordance with embodiments of the present disclosure. For instance the processor module 4 may be one tile of an array of like processor tiles on a same chip, or may be implemented as a stand-alone processor on its own chip.

The chip can receive workloads from a host 7 over an interface 9. Where the chip comprises multiple tiles, the workload is distributed over the multiple tiles that operate in parallel. There may be in excess of 1000 tiles on the chip. The processor module 4 comprises a multi-threaded processing unit 10 in the form of a barrel-threaded processing unit, and a local memory 11 (i.e. on the same tile in the case of a multi-tile array, or same chip in the case of a single-processor chip). A barrel-threaded processing unit is a type of multi-threaded processing unit in which the execution time of the pipeline is divided into a repeating sequence of interleaved time slots, each of which can be owned by a given thread. The memory 11 comprises an instruction memory 12 and a data memory 22 (which may be implemented in different addressable memory unit or different regions of the same addressable memory unit). The instruction memory 12 stores machine code to be executed by the processing unit 10, whilst the data memory 22 stores both data to be operated on by the executed code and data output by the executed code (e.g. as a result of such operations).

The memory 12 stores a variety of different threads of a program, each thread comprising a respective sequence of instructions for performing a certain task or tasks. Note that an instruction as referred to herein means a machine code instruction, i.e. an instance of one of the fundamental instructions of the processor's instruction set, consisting of a single opcode and zero or more operands.

The program may be a workload allocated to the processor module 4 by the host 7, for example to carry out machine learning tasks, for example training or inference. The program may comprise a plurality of worker threads, and a supervisor subprogram which may be structured as one or more supervisor threads. In embodiments, each of some or all of the worker threads takes the form of a respective "codelet". A codelet is a particular type of thread, sometimes also referred to as an "atomic" thread. It has all the input information it needs to execute from the beginning of the thread (from the time of being launched), i.e. it does not take any input from any other part of the program or from memory after being launched. Further, no other part of the program will use any outputs (results) of the thread until it has terminated (finishes). Unless it encounters an error, it is guaranteed to finish. (N.B. some literature also defines a codelet as being stateless, i.e. if run twice it could not inherit any information from its first run, but that additional definition is not adopted here. Note also that not all of the worker threads need be codelets (atomic), and in embodiments some or all of the workers may instead be able to communicate with one another). Note that one source of errors that could be encountered are overflow conditions. These are reduced in normal running of the program by using max/min limit values in half-precision calculations.

Within the processing unit 10, multiple different ones of the threads from the instruction memory 12 can be interleaved through a single execution pipeline 13 (though typically only a subset of the total threads stored in the instruction memory can be interleaved at any given point in the overall program). The multi-threaded processing unit 10 comprises: a plurality of context register files 26 each arranged to represent the state (context) of a different respective one of the threads to be executed concurrently; a shared execution pipeline 13 that is common to the concurrently executed threads; and a scheduler 24 for scheduling the concurrent threads for execution through the shared pipeline in an interleaved manner, preferably in a round robin manner. The processing unit 10 is connected to a shared instruction memory 12 common to the plurality of threads, and a shared data memory 22 that is again common to the plurality of threads.

The execution pipeline 13 comprises a fetch stage 14, a decode stage 16, and an execution stage 18 comprising an execution unit which may perform arithmetic and logical operations, address calculations, load and store operations, and other operations, as defined by the instruction set architecture.

Figure 3:
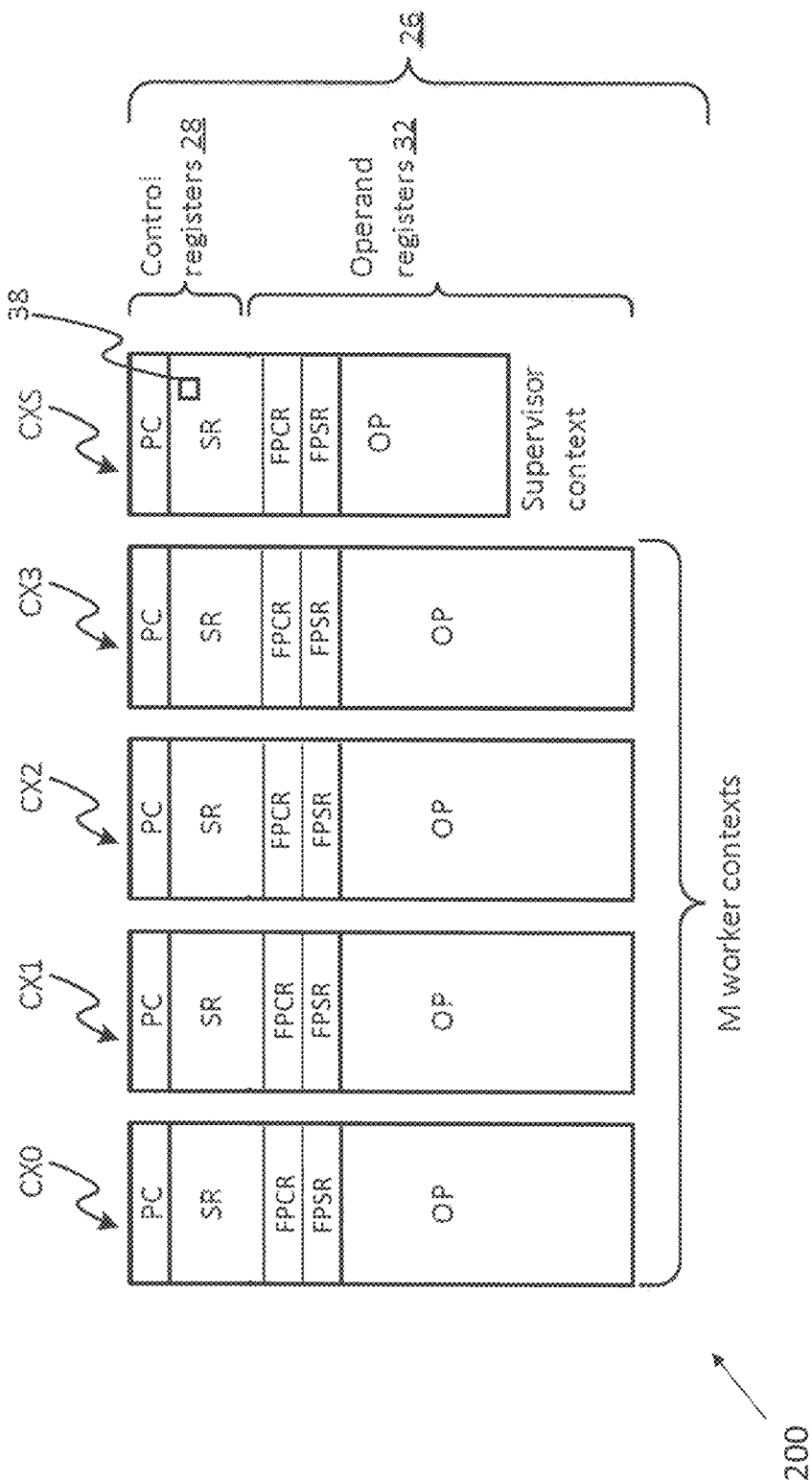
FIG. 3 is a schematic block diagram of a plurality of thread contexts.

An example of the registers making up each of the context register files 26 is illustrated schematically in FIG. 3. Each of the context register files 26 comprises a respective one or more control registers 28, comprising at least a program counter (PC) for the respective thread (for keeping track of the instruction address at which the thread is currently executing) and a set of one or more status registers (SR) recording a current status of the respective thread (such as whether it is currently running or paused, e.g. because it has encountered an error). In embodiments of the present invention, the control registers include a floating point control register FPCR and a floating point status register FPSR for handling different modes of operation in overflow conditions. Each of the context register files 26 also comprises a respective set of operand registers (OP) 32, for temporarily holding operands of the instructions executed by the respective thread, i.e. values operated upon or resulting from operations defined by the opcodes of the respective thread's instructions when executed. It will be appreciated that each of the context register files 26 may optionally comprise a respective one or more other types of register (not shown). Note also that whilst the term "register file" is sometimes used to refer to a group of registers in a common address space, this does not necessarily have to be the case in the present disclosure and each of the hardware contexts 26 (each of the register sets 26 representing each context) may more generally comprise one or multiple such register files.

As noted above, many computer calculations involve the use of floating point numbers to represent real numbers. The instructions in instruction memory 12 defined by a particular thread may be executed by the execution unit 18 to perform arithmetic operations using floating point numbers. The result of these calculations using floating point numbers are stored in data memory 22.

The processor module 4 supports a number of floating-point number formats on which the execution unit 18 is configured to perform operations. The processor module 4 supports, for example, scalar floating-point number formats, including single-precision and half-precision floating point formats. The execution unit 18 may perform a variety of different arithmetic operations using such scalar floating-point number formats according to the instructions included in the instruction memory 12, with the results being stored in data memory 22. The processor module 4 also supports vector floating-point number formats, including vectors of different lengths of single-precision floating point numbers or half-precision floating point numbers. The execution unit 18 may perform a variety of different arithmetic operations—such as addition or accumulation operations—using such vectors of floating point numbers.

As noted, the dynamic range of the half-precision floating point format is significantly lower than that of the full precision format. The range of values comprises upper and lower limits on values that can be expressed using each floating point format. For example, in half-precision floating point format, the maximum value that can be represented is 65504, and the minimum value that can be represented is −65504. The prior treatment of overflow conditions as infinity when these limit values are executed had the problem that subsequent calculations would be likely to fail, or generate NaNs, thus terminating the thread. Moreover, the inventors have noted that, the absolute value of 65504, while very large, is not large enough that infinity is a valid approximation in many contexts. That is, a large vector accumulation in a machine learning application may exceed that with a number that is meaningful mathematically and could be used in a later application if it could be represented in the precision format. By contrast, the single precision format has a dynamic range of o between minus and plus $(2-2^{-21})\times 2^{127}$, which is sufficiently large that infinity is a reasonable mathematical approximation. According to the present embodiment, the proposal for handling overflow conditions is to saturate the floating point number to ±max magnitude for half-precision numbers. In this case, if an overflow condition occurs, the value of the floating point number is set to the limit of the expressible range in the floating point format. In this case, a result that may be of some use is still obtained and the calculations can proceed. The value has been saturated to a lower magnitude than the true result so a certain amount of accuracy in the result may be lost. Further summations using the inaccurate result may yield an incorrect zero or any other number but the inventors have noticed that in many machine learning applications there is little or no impact on performance. However, unlike, the case where a NaN is produced by the execution unit 18, there may be no indication that a particular calculation had a saturated value, which makes debugging extremely challenging.

Embodiments of the application address this problem by storing (in the context registers) an indication of whether a thread operates in a first mode or a second mode. The processing unit 10 is configured to check the indication to determine whether the thread operates in a first mode or in a second mode. If the processing unit 10 determines that the thread is configured to operate in the first mode, in response to one or more calculations resulting in a value exceeding the range of the floating point format, it stores in the memory a result floating point number having one its maximum of limit values. If the processing unit 10 determines that the thread is configured to operate in a second mode, in response to the one or more calculations resulting in a value exceeding the range of the floating point format, it stores in the memory, a result floating point code representing a NaN result. In the described embodiments, the NaN result is a quiet NaN result, as it does not raise any additional exceptions when propagated. The floating point formats to which this is most applicable are those with a small dynamic range, such as half-precision. In this case "small" means that, in the context of the applications which are being executed, infinity is not a reasonable mathematical approximation to a saturation value. The second mode is referred to herein as a debugging mode, although it may have other applications. For example there may be models which should never reach the ±max limits, so setting the second mode in normal operation could indicate errors in such cases.

In embodiments with a plurality of worker threads, the first and second mode may be separately defined for each worker thread. A separate indication is stored in each of the context register files 26 of the worker threads. It would be understood by the skilled person that reference to operations performed with respect to a thread or an indication of a first and second mode described herein may be taken to mean that the operations are performed with respect to each of a plurality of threads and a plurality of associated mode indications. The mode indication for a thread is stored in the floating point control register (represented by the register name: $FP_CTL) shown as FPCR in FIG. 3 that is part of the control register associated with a worker thread. The indication stored in this register is copied from a floating point control register initial value (represented by the register name: $FP_ICTL), which is part of the control register CXS of a supervisor thread.

The copied indication of the overflow mode then causes the worker thread in question to operate in accordance with the mode which it indicates.

In some embodiments, a worker thread may be configured to modify the indication of the overflow mode stored in its own status register. In this case, the processing unit 10 may execute one or more operations associated with the worker thread to modify the indication of the overflow mode stored in the control register of the worker.

In some embodiments, the worker can read the stored indication from one or more status registers of the supervisor. In this case, the processing unit 10 may copy the indication of the overflow mode to a control register of the worker thread from a control register of the supervisor thread, when the worker starts. The worker may change the indication if required.

The stored indication may be set according to whether or not a debugging mode is active for the system. In this case, the processing unit 10 may set the indication that the thread is configured to operate in the second mode (i.e. results are converted to NaNs) in the case that a debugging mode is active. The NaNs facilitate debugging of the instructions executed on the processing unit 10 by allowing a programmer to more readily identify the operations that have led to the NaN results. The debugging mode may be set automatically by a debugging tool, or manually as part of a debugging operation.

By enabling threads to operate in two different overflow modes, it is possible to switch between the different modes depending on the required preferences. In some cases, it can be advantageous to saturate the values of the floating point numbers in the event of an overflow condition. Even though this may lead to inaccuracies in the end results for certain types of calculations, including calculations used in neural network processing, such an inaccurate end result may still have value and be preferable to production of a NaN or an ±infinity as an end result. In other cases, it may be advantageous to produce NaNs in the final output result. This has the advantage that the occurrence of an overflow condition in the system may easily be identified. This, in particular, may have value for debugging purposes, where a programmer needs to be able to identify errors in the output so as to determine any faults in the system. A NaN in the end result can be interpreted as indicating that an error has occurred. The NaN may signal an exception.

In the case that the indication of the mode indicates that the worker thread is operating in a first mode, the floating point control register stores the following:

$FP_CTL.NANOO==0b0

The processing unit 10 is configured to read this indication that the thread is operating in a first mode, and, in response, to set any results that exceed the range of values of the floating point format equal to the limit value. The processing unit 10 is additionally configured to store in a memory an overflow indication that an overflow has occurred. The indication that an overflow has occurred may be stored by setting an overflow flag in the status register of the thread. The overflow indication is stored in the floating point status register of the status register of the worker thread, and may take the form $FP_STS.OFLO==0b1

The overflow flag provides an indication that an overflow has occurred in the calculations performed by the worker thread. This overflow flag indicates that an overflow has occurred without raising an exception so as to indicate an invalid operation. In some embodiments, the file can be configured to either raise an exception on seeing the overflow flag set, or not. Typically, since the ML frameworks don't tend to operate in this mode, the exception would not be raised.

In the alternative case that the indication of the mode indicates that the worker thread is operating in a second mode, the floating point control register stores the following:

$FP_CTL.NANOO==0b1

The processing unit 10 is configured to read this indication that the relevant thread is operating in the second mode, and in response, to set any results that exceed the range of values of the floating point format to a NaN. The processing unit 10 is additionally configured to store in memory an indication that an invalid operation has taken place. The indication that an invalid operation has occurred may be stored by setting an invalid operation flag in the status register of the thread. The indication is stored in the floating point status register of the worker thread, and may be stored as the following:

$FP_STS.INV==0b1

The invalid operation flag provides an indication that an overflow has occurred in the calculations performed by the worker thread. The setting of the invalid operation flag is used to raise an exception to indicate that an invalid operation has occurred. As mentioned above, the file can be configured to either raise an exception on seeing this flag set, or not raise an exception. The setting used will depend on the operating environment. Since the NaN that is produced as a result of the calculation is a quiet NaN, no further exceptions will be raised as the quiet NaN propagates through further operations.

In some cases, the processing unit 10 may receive one or more ±infinity input values on which arithmetic operations are to be performed. For example, these may be fixed operands which are located into memory as part of erroneous code, or have come from a previous operation. The processing unit 10 is configured to treat such a ±infinity value as though it were a signalling NaN. In other words, the processing unit 10 is configured to set the floating point result of a calculation involving the one or more ±infinity input values to a quiet NaN and raise an exception by setting the invalid operation flag, i.e. by setting:

$FP_STS.INV==0b1

Other types of operations performed by the processing unit 10 that are not arithmetic operations treat ±infinity input values differently, and may output tin ±infinity results. Such operations that may be performed by the processing unit 10 to provide ±infinity results include comparison and min/max type operations, and may be performed in a single precision (f32) floating point format.

The indication as to the mode of operation for a thread may be an indication associated with a predefined level of precision. In other words, the indication applies to floating point numbers of that precision level only. For example, the indication as to whether the thread operates in the first mode or the second mode, may be an indication as to whether the thread operates in the first mode or the second mode for half-precision floating point numbers. In this case, operations using single-precision floating point numbers that exceed the limits representable using the single-precision floating point format may result in ±infinity results.

Therefore, ±infinity may result from arithmetic operations involving a first precision floating point format, even in cases where a ±infinity result cannot be represented in a second precision floating point format. An indication is stored for the second floating point format in the register for the relevant thread indicating whether or not the thread is configured to operate in the first mode or the second mode for floating point numbers of the second precision level. In some cases, the processing unit 10 may be configured to convert a floating point number representing ±infinity in such a first precision level format to a second precision level format. The processing unit 10 is, in this case, configured to store as a result of the conversion, a NaN result in the second precision level format. The NaN result is a quiet NaN. The processing unit 10 is also configured to set the invalid operation flag in the status register, i.e. to set:

$FP_STS.INV==0b1

Figure 5:
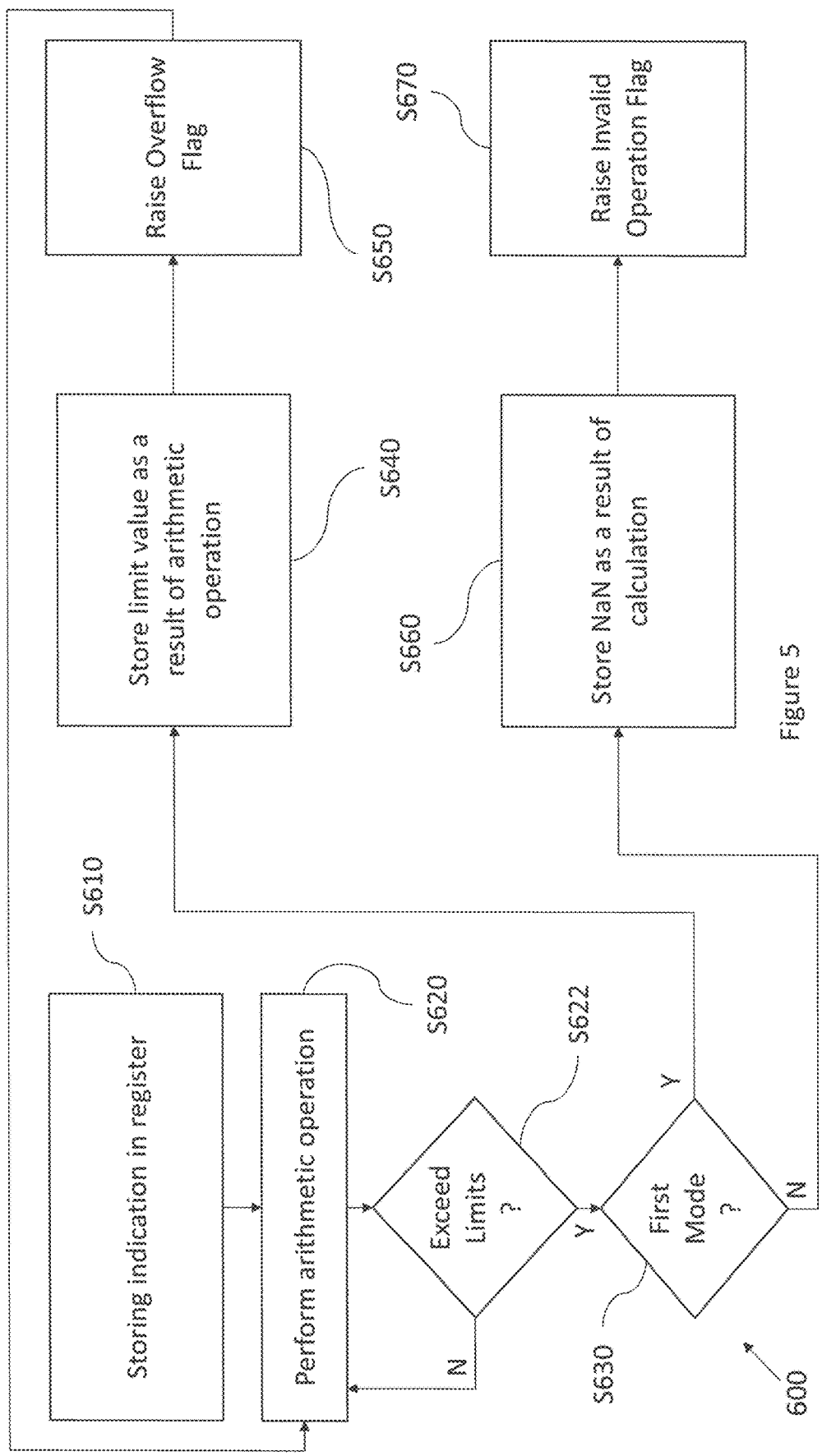
FIG. 5 schematically illustrates a method according to embodiments of the application.

Reference is made to FIG. 5, which illustrates a method 600 according to embodiments of the application. At S610, the processing unit 10 stores in a register a mode indication as to whether a thread is configured to operate in the first mode or the second mode for overflow conditions. The indication is stored in a control register associated with the thread, and may be stored based on information loaded from the control register CXS of the supervisor thread. Note that step 610 is a precursor step which is carried out automatically or manually ahead of runtime. Thus, it may be implemented by a separate program to that which performs the following steps.

At S620, the processing unit 10 is configured to perform an arithmetic operation involving floating point numbers. The arithmetic operation is part of the instructions stored for the thread in the instruction memory 12. A check is performed to see if the result exceeds the ±max limit. If no, the operations continue. If yes, the result of the arithmetic operation is outside the representable range for the floating point numbers, and the method proceeds to step S630.

At S630, the processing unit 10 is configured to read the indication stored in the register to determine whether or not the thread is configured to operate in the first mode or the second mode. In response to determining that the thread is configured to operate in the first mode, the method proceeds to S640. In response to determining that the thread is configured to operate in the second mode, the method proceeds to S660.

At S640, the processing unit 10 is configured to store in memory (e.g. in data memory 22) a limit value as a result of the arithmetic operation. In the case that the result of the arithmetic operation exceeds in magnitude, the lower limit of the representable range, the processing unit 10 is configured to store as a result of the arithmetic operation, the lower limit of the representable range. In the case that the result of the arithmetic operation exceeds in magnitude, the upper limit of the representable range, the processing unit 10 is configured to store as a result of the arithmetic operation, the upper limit of the representable range.

At S650, the processing unit 10 is configured to set the overflow flag to indicate that an overflow has occurred. The flow then returns to S620 to carry on with further calculations in the arithmetic operation.

At S660, in the case that the result of the arithmetic operation exceeds in magnitude, either the lower limit or upper limit of the representable range, the processing unit 10 is configured to store as a result of the arithmetic operation, a floating point code representing a NaN.

At S670, the processing unit 10 may be configured to raise an exception. To raise an exception, the processing unit 10 sets the invalid operation flag to indicate that an invalid operation has occurred. The arithmetic operation ceases, and an analysis operation can be performed. In some contexts, S670 can be omitted as no exception is required. In some embodiments an exception may be raised in the overflow case.

A particular architecture in which these techniques may be implemented will be discussed. The disclosed arrangement has one worker context register file CX0 . . . CX(M-1) for each of the number M of threads that can be executed concurrently (M=3 in the example illustrated but this is not limiting), and one additional supervisor context register file CXS. The worker context register files are reserved for storing the contexts of worker threads, and the supervisor context register file is reserved for storing the context of a supervisor thread. Note that in embodiments the supervisor context is special, in that it has a different number of registers than each of the workers. Each of the worker contexts preferably have the same number of status registers and operand registers as one another. In embodiments the supervisor context may have fewer operand registers than each of the workers. Examples of operand registers the worker context may have that the supervisor does not include: floating point registers, accumulate registers, and/or dedicated weight registers (for holding weights of a neural network). In embodiments, the supervisor may also have a different number of status registers. Further, in embodiments the instruction set architecture of the processor module 4 may be configured such that the worker threads and supervisor thread(s) execute some different types of instruction but also share some instruction types.

The fetch stage 14 is connected so as to fetch instructions to be executed from the instruction memory 12, under control of the scheduler 24. The scheduler 24 is configured to control the fetch stage 14 to fetch an instruction from each of a set of concurrently executing threads in turn in a repeating sequence of time slots, thus dividing the resources of the pipeline 13 into a plurality of temporally interleaved time slots, as will be discussed in more detail shortly. For example, the scheduling scheme could be round-robin or weighted round-robin. Another term for a processor operating in such a manner is a barrel threaded processor.

In some embodiments, the scheduler 24 may have access to one of the status registers SR of each thread indicating whether the thread is paused, so that the scheduler 24 in fact controls the fetch stage 14 to fetch the instructions of only those of the threads that are currently active. In embodiments, preferably each time slot (and corresponding context register file) is always owned by one thread or another, i.e. each slot is always occupied by some thread, and each slot is always included in the sequence of the scheduler 24; though the thread occupying any given slot may happen to be paused at the time, in which case when the sequence comes around to that slot, the instruction fetch for the respective thread is passed over. Alternatively it is not excluded for example that in alternative, less preferred implementations, some slots can be temporarily vacant and excluded from the scheduled sequence. Where reference is made to the number of time slots the execution unit is operable to interleave, or such like, this refers to the maximum number of slots the execution is capable of executing concurrently, i.e. the number unit's hardware supports.

Each of the first four contexts CX0 . . . CX3 is used to represent the state of a respective one of a plurality of the "worker threads currently assigned to one of the four execution time slots, for performing whatever application-specific computation tasks are desired by the programmer (note again this may only be subset of the total number of worker threads of the program as stored in the instruction memory 12). The fifth context CXS however, is reserved for a special function, to represent the state of the supervisor thread (SV) whose role it is to coordinate the execution of the worker threads, at least in the sense of assigning which of the worker threads W is to be executed in which of the time slots at what point in the overall program. Optionally, the supervisor thread may have other "overseer" or coordinating responsibilities. For example, the supervisor thread may be responsible for performing barrier synchronisations to ensure a certain order of execution. E.g. in a case where one or more second threads are dependent on data to be output by one or more first threads run on the same processor module 4, the supervisor may perform a barrier synchronization to ensure that none of the second threads begins until the first threads have finished. And/or, the supervisor may perform a barrier synchronization to ensure that one or more threads on the processor module 4 do not begin until a certain external source of data, such as another tile or processor chip, has completed the processing required to make that data available. The supervisor thread may also be used to perform other functionality relating to the multiple worker threads. For example, the supervisor thread may be responsible for communicating data externally to the processor module 4 (to receive external data to be acted on by one or more of the threads, and/or to transmit data output by one or more of the worker threads). In general, the supervisor thread may be used to provide any kind of overseeing or coordinating function desired by the programmer. For instance as another example, the supervisor may oversee transfer between the tile local memory 12 and one or more resources in the wider system such as a storage disk or network card.

Figure 4:
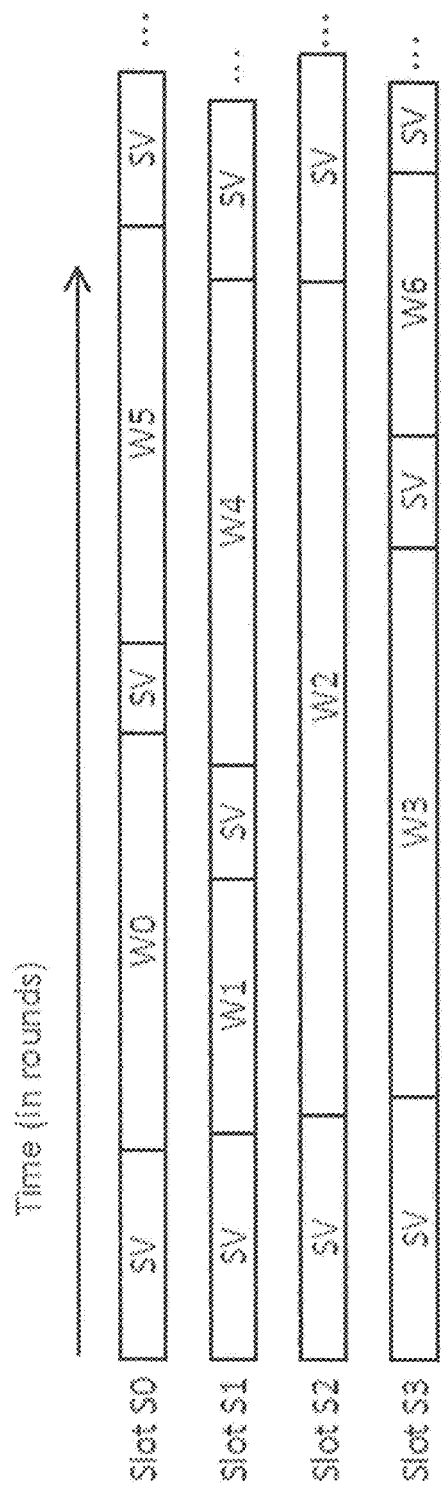
FIG. 4 schematically illustrates a supervisor thread and plurality of worker threads running in a plurality of interleaved time slots.

Referring to FIG. 4, the supervisor thread SV does not have its own time slot per se in a scheme of interleaved time slots. Nor do the workers as allocation of slots to worker threads is flexibly defined. Rather, each time slot has its own dedicated context register file (CX0 . . . CXM-1) for storing worker context, which is used by the worker when the slot is allocated to the worker, but not used when the slot is allocated to the supervisor. When a given slot is allocated to the supervisor, that slot instead uses the context register file CVS of the supervisor. Note that the supervisor always has access to its own context and no workers are able to occupy the supervisor context register file CXS.

The supervisor thread SV has the ability to run in any and all of the time slots S0 . . . S3 (or more generally S0 . . . SM-1). The scheduler 24 is configured so as, when the program as a whole starts, to begin by allocating the supervisor thread to all of the time slots, i.e. so the supervisor SV starts out running in all of S0 . . . S3. However, the supervisor thread is provided with a mechanism for, at some subsequent point (either straight away or after performing one or more supervisor tasks), temporarily relinquishing each of the slots in which it is running to a respective one of the worker threads, e.g. initially workers W0 . . . W3 in the example shown in FIG. 4. This is achieved by the supervisor thread executing a relinquish instruction, called "RUN" by way of example herein. In embodiments, this instruction takes two operands: an address of a worker thread in the instruction memory 12 and an address of some data for that worker thread in the data memory 22:

RUN task_addr, data_addr

The worker threads are portions of code that can be run concurrently with one another, each representing one or more respective computation tasks to be performed. The data address may specify some data to be acted upon by the worker thread. Alternatively, the relinquish instruction may take only a single operand specifying the address of the worker thread, and the data address could be included in the code of the worker thread; or in another example, the single operand could point to a data structure specifying the addresses of the worker thread and data. As mentioned, in embodiments at least some of the workers may take the form of codelets, i.e. atomic units of concurrently executable code. Alternatively or additionally, some of the workers need not be codelets and may instead be able to communicate with one another.

The relinquish instruction ("RUN") acts on the scheduler 24 so as to relinquish the current time slot, in which this instruction is itself executed, to the worker thread specified by the operand. Note that it is implicit in the relinquish instruction that it is the time slot in which this instruction is executed that is being relinquished (implicit in the context of machine code instructions means it doesn't need an operand to specify this—it is understood implicitly from the opcode itself). Thus the time slot which is given away is the time slot in which the supervisor executes the relinquish instruction. Or put another way, the supervisor is executing in the same space that that it gives away. The supervisor says "run this piece of code at this location", and then from that point onwards the recurring slot is owned (temporarily) by the relevant worker thread.

The supervisor thread SV performs a similar operation in each of one or more others of the time slots, to give away some or all of its time slots to different respective ones of the worker threads W0 . . . W3 (selected from a larger set W0 . . . wj in the instruction memory 12). Once it has done so for the last slot, the supervisor is suspended (then later will resume where it left off when one of the slots is handed back by a worker W).

The supervisor thread SV is thus able to allocate different worker threads, each performing one or more tasks, to different ones of the interleaved execution time slots S0 . . . S3. When the supervisor thread determines it is time to run a worker thread, it uses the relinquish instruction ("RUN") to allocates this worker to the time slot in which the RUN instruction was executed.

In some embodiments, the instruction set also comprises a variant of the run instruction, RUNALL ("run all"). This instruction is used to launch a set of more than one worker together, all executing the same code. In embodiments this launches a worker in every one of the processing unit's slots S0 . . . S3 (or more generally S0 . . . S(M-1)).

Further, in some embodiments the RUN and/or RUNALL instruction, when executed, also automatically copies some status from one or more of the supervisor status registers CXS(SR) to a corresponding one or more status registers of the worker thread(s) launched by the RUN or RUNALL. For instance the copied status may comprise one or more modes, such as the floating point overflow modes mentioned above or a floating point rounding mode (e.g. round to nearest or round to zero). The copied status or mode then controls the worker in question to operate in accordance with the copied status or mode. In embodiments, the worker can later overwrite this in its own status register (but cannot change the supervisor's status). In further alternative or additional embodiments, that the workers can choose to read some status from one or more status registers of the supervisor (and again may change their own status later). E.g. again this could be to adopt a mode from the supervisor status register, such as a floating point mode or a rounding mode. In embodiments however, the supervisor cannot read any of the context registers CX0 . . . of the workers.

Each of the currently allocated worker threads W0 . . . W3 proceeds to perform the one or more computation tasks defined in the code specified by the respective relinquish instruction. At the end of this, the respective worker thread then hands the time slot in which it is running back to the supervisor thread.

What is claimed is:

1. A processing system comprising:
a processing unit configured to execute one or more arithmetic operations using values represented by digital representations which extend between predefined limit values;
at least one register configured to store a mode indication indicating operation in a first mode or a second mode;
at least one memory for storing outputs of the one or more arithmetic operations,
wherein the processing unit is configured to:
check the mode indication to determine whether the arithmetic operation is to be executed in the first mode or in the second mode;
wherein in the first mode, in response to the respective arithmetic operation resulting in a value exceeding a limit value of the digital representation, a result number having the limit value is stored in the memory; and
in a second mode, in response to the respective arithmetic operation resulting in a value exceeding a limit value of the digital representation, an output code is stored with the memory, the output code indicating a result that cannot be processed as a value.

2. A processing system as claimed in claim 1, wherein: each arithmetic operation is defined by a respective thread of a plurality of threads; and the register stores a plurality of mode indications each associated with one of the plurality of threads.

3. A processing system as claimed in claim 1 wherein the one or more arithmetic operations use floating point numbers belonging to a floating point format having predefined limit values, said predefined limit values comprising a maximum value representable in the floating point format and a minimum value representable in the floating point format.

4. A processing system as claimed in claim 2, wherein the at least one register comprises a plurality of status registers each associated with one of the plurality of threads.

5. A processing system as claimed in claim 1, wherein the processing unit is configured to write the mode indication to the at least one register to indicate the second mode in response to determining that a debugging mode is active for the processing system.

6. A processing system as claimed in claim 3, wherein the mode indication set the first mode for a first floating point precision and not for a second floating point precision.

7. A processing system as claimed in claim 6, wherein the first floating point precision is half-precision and the second floating point precision is single precision.

8. A processing system as claimed in claim 1, wherein the processing unit is configured to in response to the respective arithmetic operation resulting in a value exceeding the range of the floating point format, set a flag indicating an overflow condition has occurred.

9. A processing system as claimed in claim 1, wherein the processing unit is configured to in the second mode, in response to the respective arithmetic operation resulting in a value exceeding the range of the floating point format, raise an exception.

10. A processing system as claimed in claim 1, wherein the processing unit is configured to
receive a floating point number representing positive or negative infinity;
perform a calculation using said floating point number representing positive or negative infinity; and
storing as a result of the calculation a floating point number representing a not a number (NaN).

11. A processing system as claimed in claim 10, wherein the processing unit is configured to raise an exception in response to the calculation.

12. A processing system as claimed in claim 1, wherein the processing unit is configured to:
convert a floating point number at a first precision level to a floating point number at a second precision level,
wherein the floating point number at the first precision level represents positive or negative infinity,
wherein the floating point number at the second precision level represents a not a number (NaN).

13. A processing system as claimed in claim 12, wherein the processing unit is configured to raise an exception in response to the conversion.

14. A method for executing one or more arithmetic operations using values represented by digital representations which extend between predefined limit values, the method comprising:
storing a mode indication indicating operation in a first mode or a second mode;
storing outputs of the one or more arithmetic operations;

checking the mode indication to determine whether the arithmetic operation is to be executed in the first mode or in the second mode;

wherein in the first mode, in response to the respective arithmetic operation resulting in a value exceeding a limit value of the digital representation, a result number having the limit value is stored in a memory; and in the second mode, in response to the respective arithmetic operation resulting in a value exceeding a limit value of the digital representation, an output code is stored in the memory, the output code indicating a result that cannot be processed as a value.

15. A method according to claim 14, wherein:

each arithmetic operation is defined by a respective thread of a plurality of threads; and a plurality of mode indications are stored each associated with one of the plurality of threads.

16. A method according to claim 14, wherein the one or more mode indication is written to the at least one register to indicate the second mode in response to determining that a debugging mode is active for the processing system.

17. A method according to claim 14, comprising:

receiving a floating point number representing positive or negative infinity;

performing a calculation using said floating point number representing positive or negative infinity; and storing as a result of the calculation a floating point number representing a not a number (NaN).

18. A method according to claim 14, wherein an exception is raised in response to the calculation.

19. A method according to claim 14, the method comprising:

converting a floating point number at a first precision level to a floating point number at a second precision level, wherein the floating point number at the first precision level represents positive or negative infinity, wherein the floating point number at the second precision level represents a not a number (NaN).

20. A non-transitory computer readable medium comprising computer program instructions which when executed cause a hardware module to carry out a method, the method comprising:

storing a mode indication indicating operation in a first mode or a second mode;

checking the mode indication to determine that an arithmetic operation is to be executed in the first mode; and wherein in the first mode, in response to the arithmetic operation resulting in a value exceeding a limit value, a result number having the limit value is stored in a memory.

21. A non-transitory computer readable medium according to claim 20, wherein the computer program instructions cause the hardware module to:

for a subsequent arithmetic operation, and in the second mode, in response to the subsequent arithmetic operation resulting in another value exceeding the limit value, an output code is stored with a memory associated with the hardware module, the output code indicating a result that cannot be processed.

22. A non-transitory computer readable medium according to claim 20, wherein the computer program instructions cause the hardware module to:

receive a floating point number representing positive or negative infinity;

perform a calculation using the floating point number representing positive or negative infinity; and store as a result of the calculation a floating point number representing a not a number (NaN) in response to the mode indication indicating a debugging mode.

23. A non-transitory computer readable medium according to claim 20, wherein the computer program instructions cause the hardware module to:

convert a floating point number at a first precision level to a floating point number at a second precision level for a subsequent arithmetic operation in the second mode, wherein the floating point number at the first precision level represents positive or negative infinity, and wherein the floating point number at the second precision level represents a not a number (NaN).

* * * * *